US012751879B2

(12) United States Patent
Ando

(10) Patent No.: US 12,751,879 B2
(45) Date of Patent: Oct. 6, 2026

(54) CARE BED

(71) Applicant: FUJI WORLD Co., Ltd., Toyota (JP)

(72) Inventor: Yuichi Ando, Toyota (JP)

(73) Assignee: FUJI WORLD Co., Ltd., Toyota (JP)

( * ) Notice: Subject to any disclaimer, the term of this patent is extended or adjusted under 35 U.S.C. 154(b) by 0 days.

(21) Appl. No.: 18/958,025

(22) Filed: Nov. 25, 2024

(65) Prior Publication Data

US 2025/0082529 A1 Mar. 13, 2025

Related U.S. Application Data

(63) Continuation of application No. PCT/JP2023/047101, filed on Dec. 27, 2023.

(30) Foreign Application Priority Data

Jan. 27, 2023 (JP) ................................ 2023-010831

(51) Int. Cl.
*A61G 7/018* (2006.01)
*A61G 7/008* (2006.01)
*A61G 7/10* (2006.01)

(52) U.S. Cl.
CPC ........... *A61G 7/1076* (2013.01); *A61G 7/008* (2013.01); *A61G 7/018* (2013.01)

(58) Field of Classification Search
CPC ...... A61G 7/1076; A61G 7/008; A61G 7/018; A61G 7/015; A61G 7/05; A61G 13/009; A61G 13/08; A61G 13/0009; A61G 13/121; A61G 13/04; A61G 13/02; A61H 1/0222; A47D 9/02; A47D 9/053; A47D 9/057; A63G 13/02
See application file for complete search history.

(56) References Cited

U.S. PATENT DOCUMENTS 4,195,829 A * 4/1980 Reser ..................... A61G 13/02
5/607
5,208,928 A * 5/1993 Kuck ..................... A61G 13/02
5/608

(Continued)

FOREIGN PATENT DOCUMENTS

JP 1988-168158 A 7/1988
JP 3032665 U 12/1996

(Continued)

OTHER PUBLICATIONS

International Search Report from International Application No. PCT/JP2023/047101 mailed Feb. 27, 2024.

*Primary Examiner* — Aaron R Eastman
(74) *Attorney, Agent, or Firm* — Shih IP Law Group, PLLC.

(57) ABSTRACT

An object of the invention is to provide a care bed that allows a care recipient to easily raise himself/herself and stand up on the floor or the like from a state of lying on the bed. The care bed of the present invention has a bed body having a first support part for supporting a lower body and a second support part for supporting an upper body. The bed body is divided into at least the first support part and a second support part in a width direction of the bed body, and the first support part is a movable body that can rotate around a rotation axis extending along a longitudinal direction of the bed body.

11 Claims, 12 Drawing Sheets

(56) References Cited

U.S. PATENT DOCUMENTS

| | | | | |
|---|---|---|---|---|
| 6,260,220 | B1 * | 7/2001 | Lamb | A61G 13/12<br>5/607 |
| 2006/0117479 | A1 * | 6/2006 | Kawakami | A61G 7/015<br>5/411 |
| 2006/0162079 | A1 * | 7/2006 | Menkedick | A61G 7/0514<br>5/624 |
| 2009/0094744 | A1 * | 4/2009 | Benzo | A61G 7/015<br>5/608 |
| 2014/0033434 | A1 * | 2/2014 | Jackson | A61G 13/0054<br>5/607 |
| 2014/0250598 | A1 * | 9/2014 | Sharps | A61G 13/04<br>5/608 |
| 2015/0059094 | A1 * | 3/2015 | Jackson | A61G 13/04<br>5/608 |
| 2016/0089287 | A1 * | 3/2016 | Buerstner | A61G 13/105<br>5/616 |
| 2016/0095773 | A1 * | 4/2016 | Ruch | G16H 40/63<br>5/616 |
| 2016/0193098 | A1 * | 7/2016 | Nichols | A61G 13/121<br>602/32 |
| 2019/0336369 | A1 * | 11/2019 | Tavares | A61G 7/005 |
| 2022/0160141 | A1 * | 5/2022 | Kamei | A61G 7/005 |
| 2023/0301853 | A1 * | 9/2023 | Chuang | A61G 7/018 |

FOREIGN PATENT DOCUMENTS

| | | | |
|---|---|---|---|
| JP | 2001-008979 | A | 1/2001 |
| JP | 2004-097240 | A | 4/2004 |
| JP | 2006-055589 | A | 3/2006 |
| JP | 2009-089860 | A | 4/2009 |
| JP | 2020-010822 | A | 1/2020 |
| WO | 2020208950 | A1 | 10/2020 |

* cited by examiner

CARE BED

TECHNICAL FIELD

The present invention relates to a care bed used for caring for a care recipient.

BACKGROUND ART

Patent Literature 1 proposes a turning support bed comprising a head frame having a tiltable bed surface, a movable stage for moving the head frame, and a fixed stage that supports the movable stage via rollers attached to the movable stage. The fixed stage is provided with elevating and lowering parts for elevating and lowering the movable stage, on the left and right sides of the fixed stage. The side portions of the movable stage are elevated and lowered by the elevating and lowering parts, and the rollers accordingly roll inward, and the movable stage tilts. Further, a tension spring is attached to the elevating and lowering parts to apply a load in a direction where the inclination of the movable stage becomes smaller.

Patent Literature 2 proposes a care bed comprising two stand frames with extendable legs, a leg connection frame that connects the legs of two stand frames, a stand connection frame that connects the two stand frames, a head frame body having a vertically movable frame member having a vertically moving drive means for vertically moving the stand connection frame, a foot frame body similar to the head frame body, a head foot connecting member that allows both frame bodies to face each other, two hanging members that are rotatably hung to hanging shafts connected to the vertically movable frame members of the opposing head frame body and foot frame body with an imaginary axis that connects both hanging shafts as a center of rotation, a bed body hung by two hanging members, a tilt control member that controls the rotation of the hanging members, and a bathtub located below the bed body.

Patent Literature 3 proposes a care bed comprising a main bed, a right sub-bed, a left sub-bed, and a base 4. When a first front rotation mechanism, a first rear rotation mechanism, and a second front rotation mechanism and a second rear rotation mechanism are driven, and first and second central wires are pulled, and first and second right and first and second left wires are loosened, then the main bed rotates around a shaft of a left hinge, and the right sub-bed rotates upward to a right tilted position due to a bias of a right leaf spring, and the left sub-bed rotates upward to a left tilted position due to a bias of a left leaf spring.

CITATION LIST

Patent Literature

Patent Literature 1: Japanese Patent No. 2004-97240A
Patent Literature 2: Japanese Patent No. 2009-89860A
Patent Literature 3: Japanese Patent No. 2020-10822A

SUMMARY OF INVENTION

Technical Problem

In the beds proposed in Patent Literatures 1 to 3, the entire bed is tilted so that a caregiver can easily provide care. Specifically, it can be used when a care recipient turns over or changes the body position. However, in nursing care settings, a care recipient often stands up from a lying position on a bed with the help of a caregiver or by themselves. The beds proposed in Patent Literatures 1 to 3 do not take such usage into consideration, and the possibility that a care recipient falls out of bed cannot be denied if the bed is tilted to help a care recipient stand up from a state of lying on the bed.

The present invention has been made in view of these problems, and provides a care bed that allows a care recipient to easily raise his/her upper body and stand up on the floor etc. from a state of lying on the bed.

Solution to Problem

The invention for solving the above problem includes a care bed including a bed body, the bed body including: a first support part for supporting a lower body; and a second support part for supporting an upper body, wherein the bed body is divided into at least the first support part and the second support part in a width direction of the bed body, the first support part is a movable body that can rotate around a rotation axis extending along a longitudinal direction of the bed body, the second support part is a movable body that can rotate around the rotation axis, the first support part and the second support part can rotate independently of each other around the rotation axis, and the rotation axis is located above the first support part and the second support part.

According to this configuration, since a tilting angle of the first support part can be set freely, the lower body can be tilted by tilting the first support part. Thereby, a care recipient can easily put the lower body on the floor and stand up. Further, according to this configuration, since tilting angles of the first support part and the second support part can be set freely, for example, the tilting angle of the first support part can be made larger than the tilting angle of the second support part, so that the lower body can be tilted more than the upper body. Thereby, the care recipient can easily raise his/her upper body and stand up without feeling like falling off the bed. Further, according to this configuration, since the rotation axis is located above the first support part and the second support part, the bed has a mechanism that swings like a hammock. Therefore, when the bed rotates, the care recipient on the bed is supported while being pressed against the both support parts. This allows the care recipient to avoid anxiety that he or she may fall off the bed.

Note that "a lower body" refers to a region including thighs and below thighs, and does not necessarily include buttocks. Further, regarding thighs, it is not necessary to include entire thighs, but only a part of thighs may be included.

Note that "an upper body" refers to a region including a back and above a back and does not necessarily include a lower back and buttocks. Further, regarding a back, it is not necessary to include an entire back, but only a part of a back may be included.

Note that the terms regarding rotation around the rotation axis include clockwise and counterclockwise rotations.

Preferably, the care bed further comprises a first drive unit that rotates the first support part around the rotation axis, and a second drive unit that rotates the second support part around the rotation axis.

According to this configuration, since a first drive unit that rotates the first support part around the rotation axis and a second drive unit that rotates the second support part around the rotation axis are provided, the rotation functionality is improved. This makes possible for a caregiver or a care recipient to easily rotate the bed.

Preferably, the care bed comprises a control unit that generates a control signal to instruct operation of the first drive unit and the second drive unit, and outputs the control signal to the first drive unit and the second drive unit.

According to this configuration, since a control unit is provided which instructs operation of the first drive unit and the second drive unit based on a control signal, the first support part and the second support part can be controlled to an appropriate tilted state according to conditions of a care recipient.

Preferably, the control unit outputs a first signal to instruct rotation of the first support part to the first drive unit, and after the instruction is finished, the control unit outputs a second signal to the first drive unit and the second drive unit to instruct rotation of the first support part and the second support part to further increase a tilting angle of the first support part.

According to this configuration, since the control unit outputs a first signal to instruct rotation of the first support part to the first drive unit, and after the instruction is finished, the control unit outputs a second signal to the first drive unit and the second drive unit to instruct rotation of the first support part and the second support part to further increase a tilting angle of the first support part, a care recipient can stand up from the bed with peace of mind without feeling like falling. It is preferable to simultaneously rotate the first support part and the second support part in the second operation.

Preferably, rotation angles of the first support part and the second support part in the second operation are the same.

According to this configuration, since rotation angles of the first support part and the second support part in the second operation is the same, rotation speed of the first support part and the second support part in the second operation can be set to the same. As a result, a care recipient can be rotated in a comfortable state without feeling any discomfort.

Preferably, a rotation angle at which the first support part rotates in response to the first signal is 2 to 5 degrees.

According to this configuration, by setting a rotation angle at which the first support part rotates in response to the first signal in a range of 2 to 5 degrees, a care recipient can easily raise himself/herself up from a lying position and stand up from the bed smoothly. If the rotation angle of the first support part is smaller than 2 degrees or larger than 5 degrees, it is difficult for the care recipient who is lying to stand up smoothly from the bed.

Preferably, rotation angles at which the first support part and the second support part rotate in response to the second signal is 2 to 5 degrees.

According to this configuration, by setting rotation angles at which the first support part and the second support part rotate in response to the second signal in a range of 2 to 5 degrees, a care recipient can easily raise himself/herself up from a lying position and stand up from the bed smoothly. Preferably, the first support part and the second support part are simultaneously rotated in response to the second signal. If the rotation angles of the first support part and the second support part are smaller than 2 degrees or larger than 5 degrees, it is difficult for the care recipient who is lying to stand up smoothly from the bed.

In the present invention, the second support part may be a fixed body which is fixed.

According to this configuration, since the second support part for supporting the upper body is fixed, increase in number of parts constituting the care bed can be suppressed, and cost reduction can be realized.

The present invention includes a care bed including a bed body, the bed body having: a first support part for supporting a lower body; and a second support part for supporting an upper body, wherein the bed body is divided into at least the first support part and the second support part in a width direction of the bed body, the first support part is a movable body that can rotate around a rotation axis extending along a longitudinal direction of the bed body, and the rotation axis is located above the first support part.

According to this configuration, since a tilting angle of the first support part can be set freely, the lower body can be tilted by tilting the first support part. Thereby, the care recipient can easily put the lower body on the floor and stand up. Moreover, according to this configuration, when the first support part rotates, the care recipient on the bed is supported while being pressed against the first support part. This allows the care recipient to avoid anxiety that he or she may fall off the bed.

Preferably, the care bed further comprises a drive unit that rotates the first support part around the rotation axis.

According to this configuration, since the care bed further comprises a drive unit that rotates the first support part around the rotation axis, rotation functionality of the bed is increased and a caregiver or a care recipient can easily rotate the bed.

Preferably, the care bed further comprises a control unit that generates a control signal to instruct operation of the drive unit and outputs the control signal to the drive unit.

According to this configuration, since a control unit is provided which instructs operation of the drive unit based on a control signal, the first support part can be brought into an appropriate tilting state according to conditions of a care recipient.

Preferably, a rotation angle of the first support part at which the first support part rotates in response to the control signal is 2 to 5 degrees.

According to this configuration, by setting a rotation angle of the first support part in a range of 2 to 5 degrees, a care recipient can easily raise himself/herself up from a lying position and stand up from the bed smoothly. If the rotation angle of the first support part is smaller than 2 degrees or larger than 5 degrees, it is difficult for the care recipient who is lying to stand up smoothly from the bed.

DESCRIPTION OF EMBODIMENTS

Hereinafter, an embodiment of a care bed of the present invention will be described in detail with reference to FIGS. 1 to 10.

Figure 1:
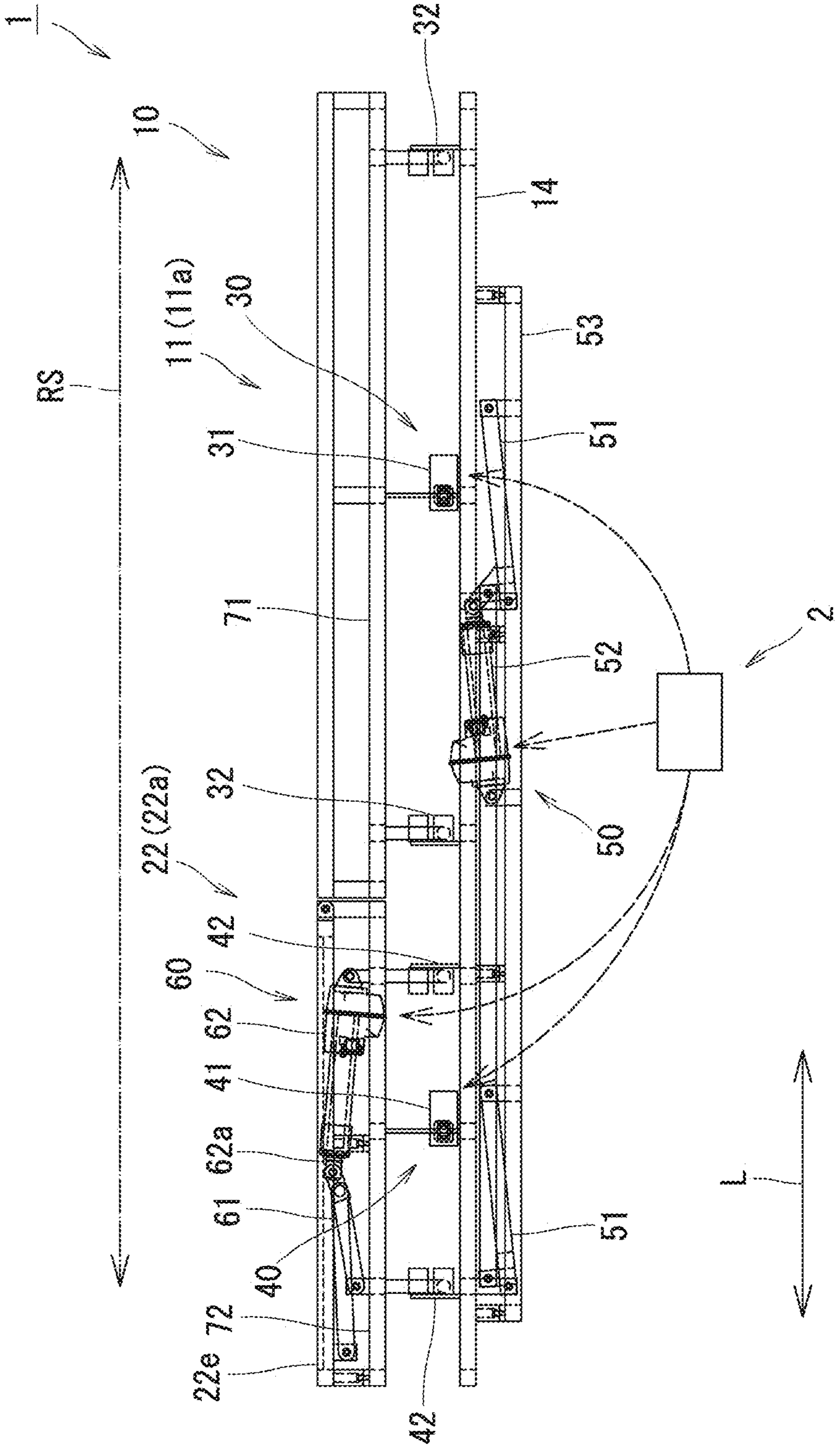
FIG. 1 is a front view of a care bed in the present embodiment.

FIG. 1 is a front view of a care bed 1. The care bed 1 includes a bed body 10 having a first support part 11 for supporting a lower body, and a second support part 22 for supporting an upper body. The bed body 10 is divided into at least the first support part 11 and the second support part 22 along a width direction W of the bed body 10 (direction perpendicular to the plane of the paper in FIG. 1, see FIGS. 7 and 8). The first support part 11 and the second support part 22 are respectively movable bodies 11*a* and 22*a* that are configured to rotate around a rotation axis RS extending along a longitudinal direction L of the bed body 10. In the care bed 1, the first support part 11 is configured to rotate around the rotation axis RS by operating a first drive unit 30 and the second support part 22 is configured to rotate around the rotation axis RS by operating a second drive unit 40 according to an instruction from a control unit 2 (indicated by arrows S in FIGS. 7 and 8). Rotation of the first support part 11 and rotation of the second support part 22 can be realized independently. The first support part 11 plays a role of supporting the lower body, and the second support part 22 plays a role of supporting the upper body. Furthermore, by operating an elevating and lowering drive unit 50, the first support part 11 and the second support part 22 are simultaneously elevated and lowered by a same distance, and by operating a reclining drive unit 60, an end portion 22*e* of the second support part 22 rotates in a direction from a prone position to a standing up position. The first drive unit 30, the second drive unit 40, the elevating and lowering drive unit 50, and the reclining drive unit 60 operate upon receiving instructions from the control unit 2.

In the present embodiment, the care bed 1 is divided into two parts and has the first support part 11 and the second support part 22, but the invention is not limited to this. For example, it may be configured to be divided into three parts by adding a part that supports buttocks.

In this embodiment, "supporting a lower body" means supporting a region including thighs and below thighs, and does not necessarily mean supporting buttocks as well. Further, as for thighs, it is not necessary to support entire thighs, and it is sufficient to support a part of thighs.

Furthermore, "supporting an upper body" means supporting a region including a back and above a back, and does not necessarily mean supporting a lower back and buttocks as well. Furthermore, as for a back, it is not necessary to support entire back, but only a part of a back can be supported.

The rotation axis RS is located above the first support part 11 and the second support part 22 and extends in the longitudinal direction L of the bed body 10 in parallel to the first support part 11 and the second support part 22. Here, the longitudinal direction L is a direction in which the first support parts 11 and the second support parts 22 are arranged in a row. Moreover, the rotation axis RS is located at a same distance from both side ends extending along the longitudinal direction L of the care bed 1 in a side view.

Figure 2:
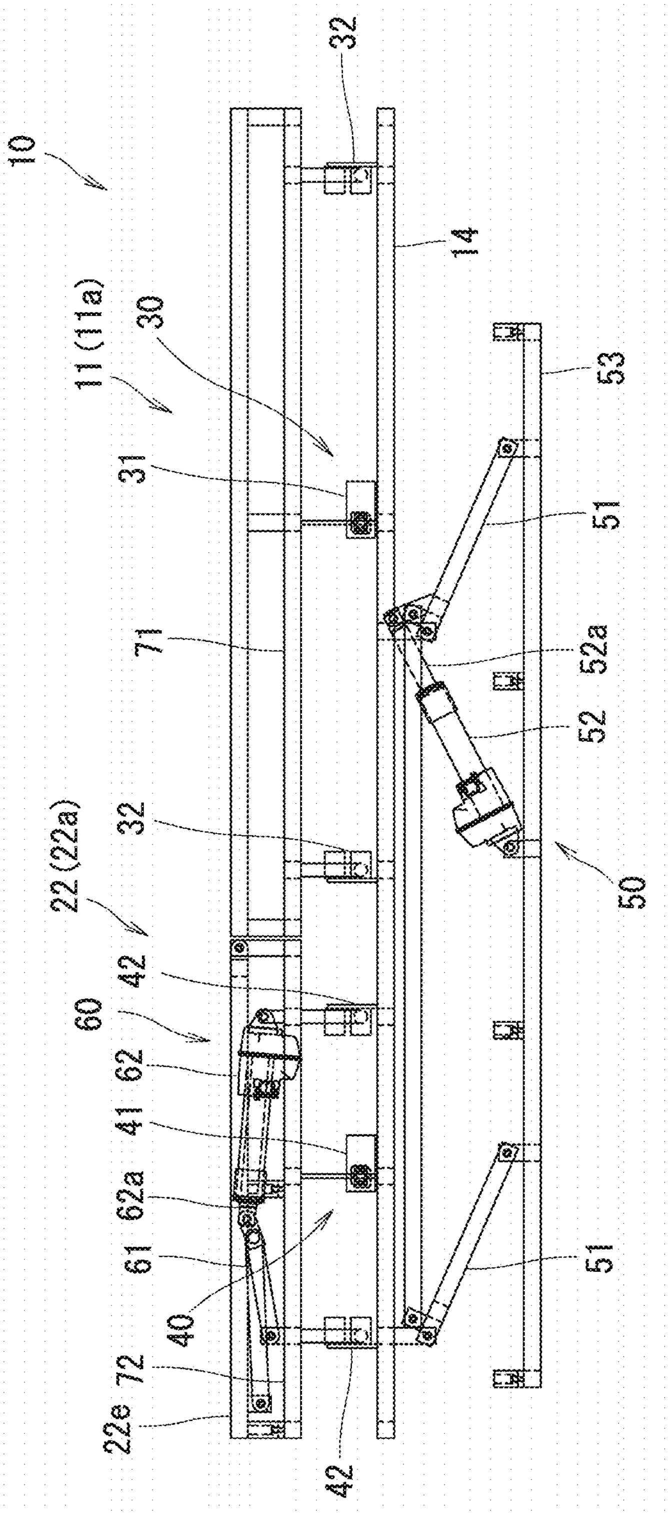
FIG. 2 is a front view of an elevating and lowering drive unit.

As shown in FIG. 2, the elevating and lowering drive unit 50 moves a piston 52*a* of an elevating and lowering actuator 52 forward and backward, so that an elevating and lowering link mechanism 51 moves up and down with rotation. The elevating and lowering actuator 52 is rotatably connected to a base 53 at one end and to the elevating and lowering link mechanism 51 at the other end. By moving the piston 52*a* forward and backward, the elevating and lowering actuator 52 and the elevating and lowering link mechanism 51 move up and down with rotation. The first support part 11 and the second support part 22 supported by the elevating and lowering link mechanism 51 also move up and down as the elevating and lowering link mechanism 51 moves up and down.

Figure 3:
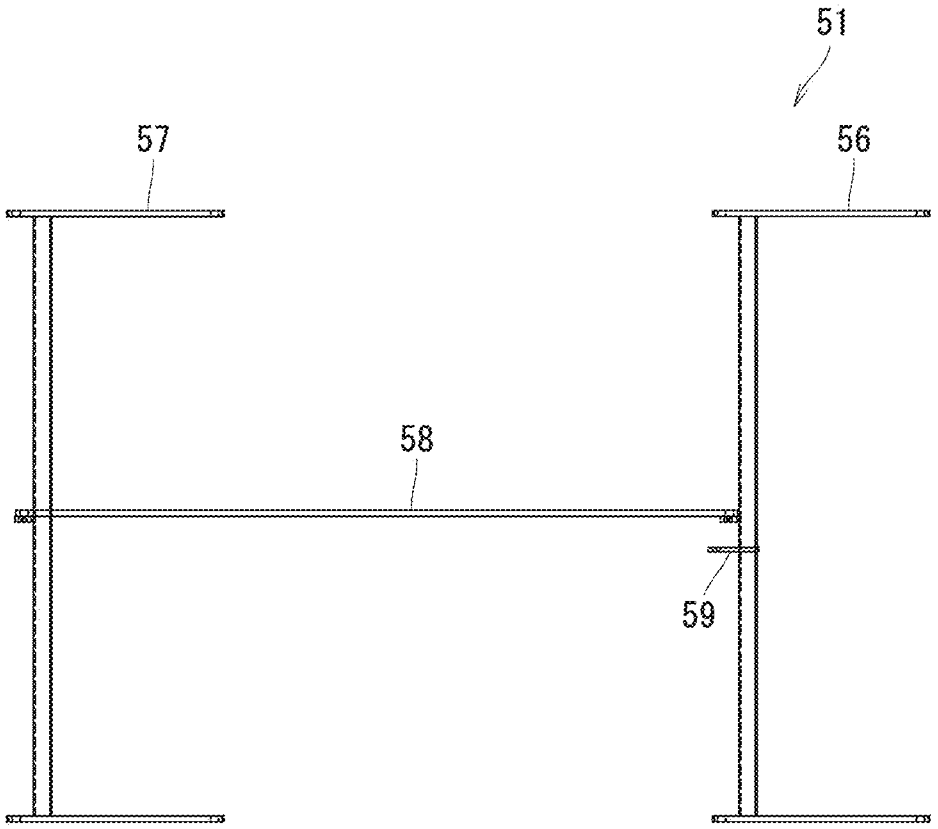
FIG. 3 is a plan view of an elevating and lowering link mechanism.

The elevating and lowering link mechanism 51 is a member for elevating and lowering a support frame 14. And, the support frame 14 supports the first support part 11 and the second support part 22. As shown in FIG. 3, the elevating and lowering link mechanism 51 has a structure in which elevating and lowering link members 56 and 57 are connected via a connecting bar 58, and one end is rotatably connected to the base 53 and the other end is rotatably connected to the support frame 14. By being connected by the connecting bar 58, the elevating and lowering link members 56 and 57 move and displace in synchronization. A connecting member 59 for rotatably connecting the elevating and lowering actuator 52 is attached to an intermediate portion of the elevating and lowering link member 56.

Figure 4:
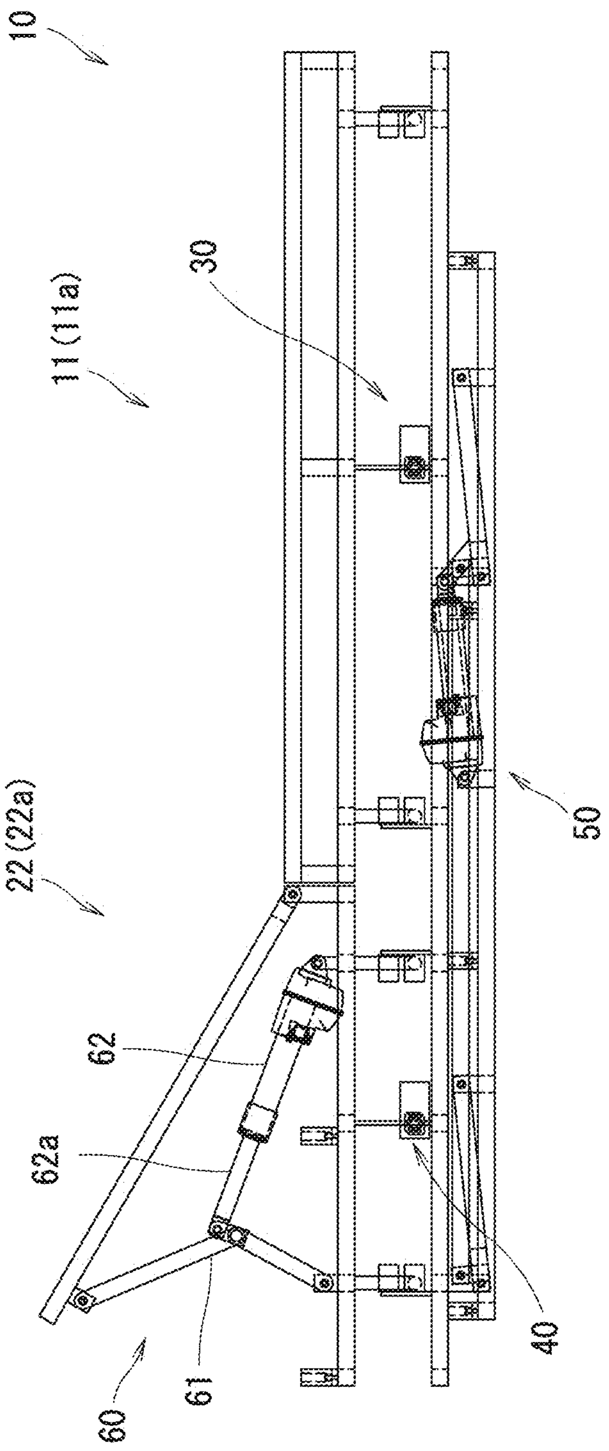
FIG. 4 is a front view of a reclining drive unit.
Figure 5:
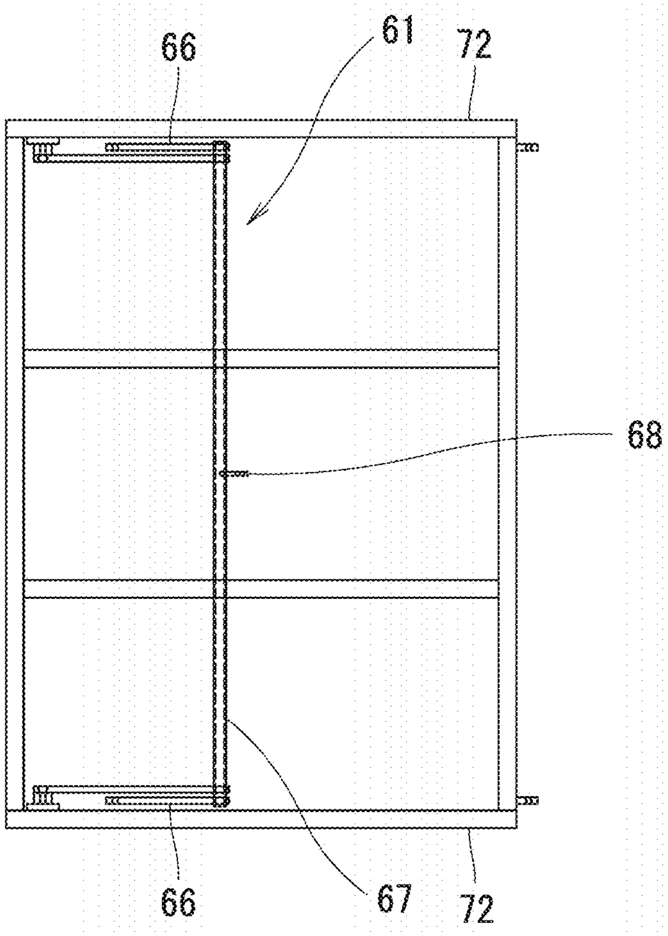
FIG. 5 is a plan view of a reclining link mechanism.

As shown in FIGS. 4 and 5, the reclining drive unit 60 includes a reclining actuator 62 and a reclining link mechanism 61. The reclining actuator 62 is rotatably connected to a second support frame 72 at one end and to the reclining link mechanism 61 at the other end. The reclining link mechanism 61 is rotatably connected to the second support frame 72 at one end and the second support part 22 at the other end. The second support part 22 is rotatably connected to the second support frame 72 at an end near the first support part 11. In the reclining drive unit 60, a piston 62*a* of the reclining actuator 62 moves forward and backward, so that the reclining link mechanism 61 moves up and down with rotation. As the piston 62*a* moves forward, the second support part 22 rotates in a direction in which the end portion 22*e* rises from a down position. Further, as the piston 62*a* moves backward, the second support part 22 moves to its initial position so as to lie down toward the second support frame 72 while rotating its end portion 22*e* downward in the drawing.

The reclining link mechanism 61 includes a pair of reclining link members 66, 66 and a connecting bar 67. The reclining link member 66 is rotatably connected to the second support frame 72 at one end and to the second support part 22 at the other end. Further, an intermediate portion of the reclining link member 66 has a hinge portion for each member to rotate. The connecting bar 67 is a member that connects the pair of reclining link members 66, 66, and its end portion is rotatably connected to the intermediate portion of the reclining link member 66. A connecting member 68 for rotatably connecting to the reclining actuator 62 is attached to an intermediate portion of the connecting bar 67.

Figure 6:
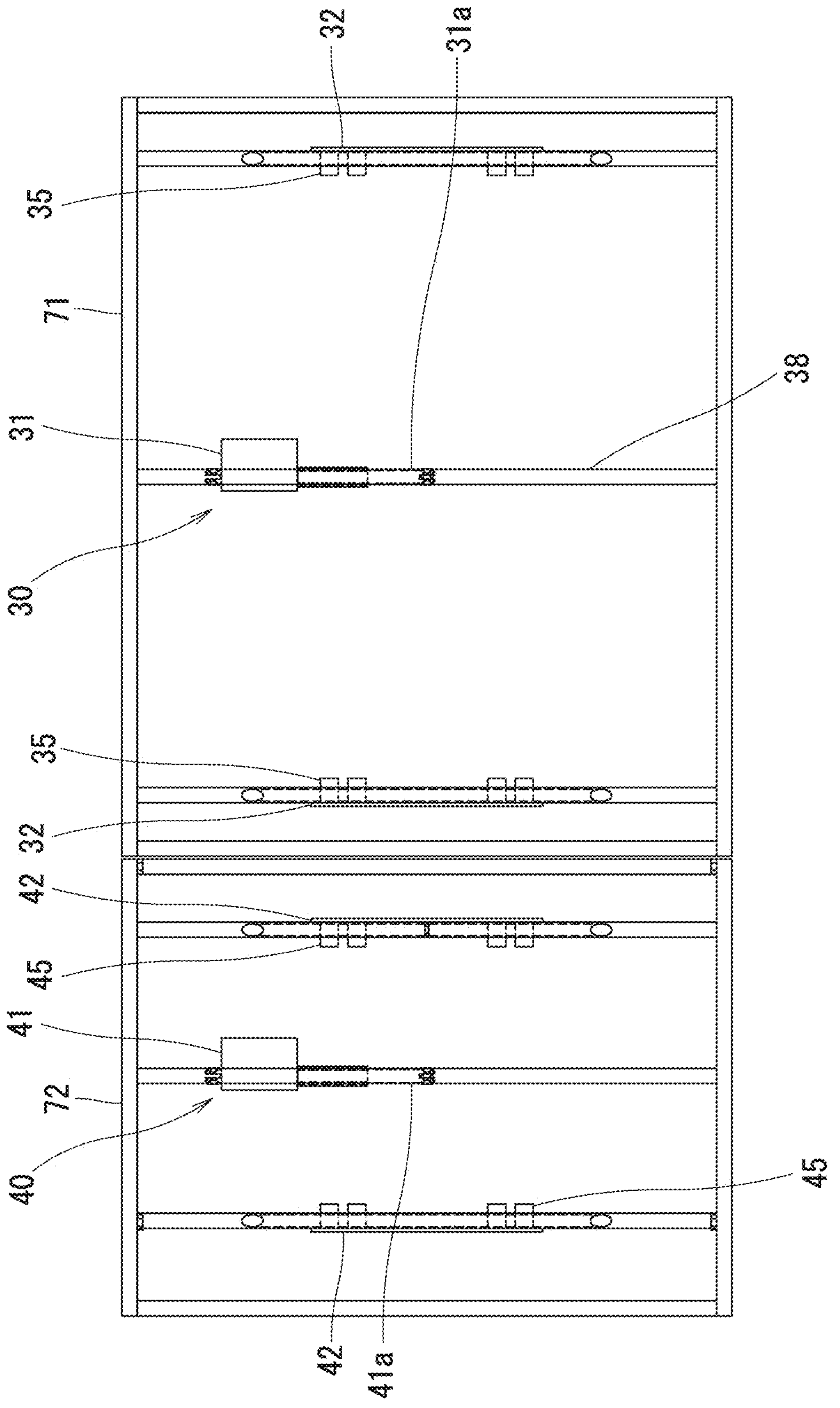
FIG. 6 is a plan view of a first support part and a second support part.
Figure 7:
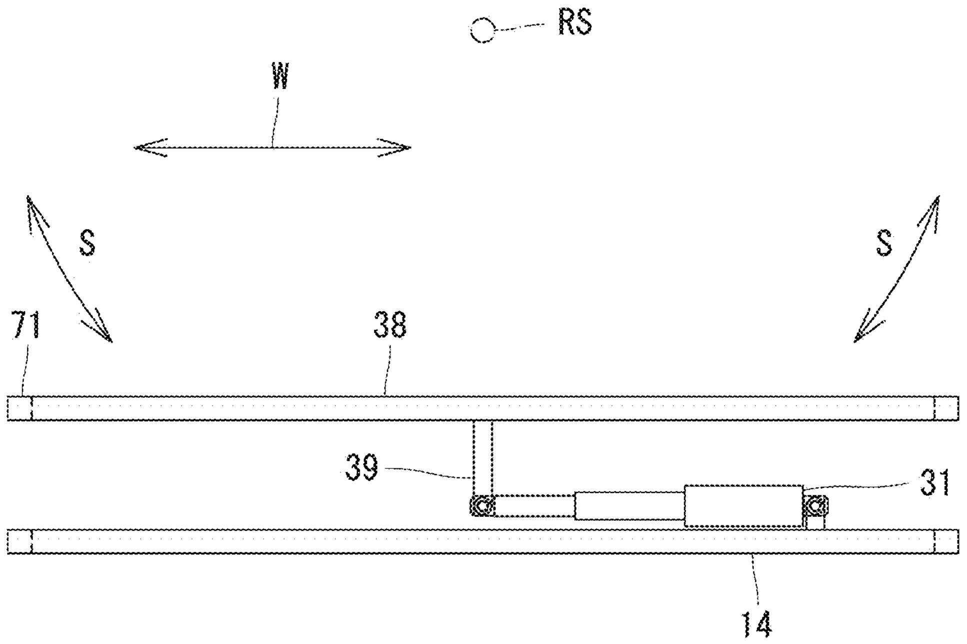
FIG. 7 is a side view of a first drive unit.
Figure 8:
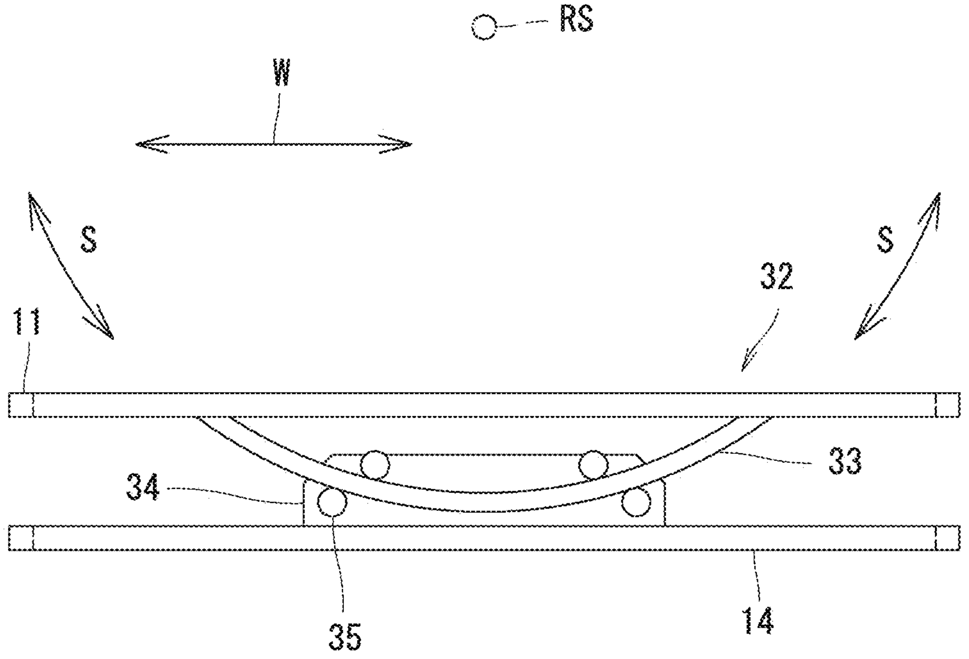
FIG. 8 is a side view of a first guide part.

The first support part 11 is fixed to a first support frame 71. Further, it is supported by the support frame 14 via the first drive unit 30 (see FIG. 1). As shown in FIGS. 6, 7, and 8, the first drive unit 30 includes a first actuator 31 and a pair of first guide parts 32. The first actuator 31 is located between the pair of first guide parts 32, 32. One end of the first actuator 31 is rotatably connected to the support frame 14, and the other end is rotatably connected to a connecting frame 38 via a connecting member 39. The connection frame 38 is a member that spans both side ends of the first support frame 71.

The first guide part 32 is a member that spans both side ends of the first support frame 71, and has a first guide frame 33 having an arc shape. The first guide frame 33 is held between rollers 35 that are rotatably fixed to a guide frame fixing part 34. Further, the guide frame fixing part 34 is fixed to the support frame 14.

As a piston of the first actuator 31 moves forward and backward, the first guide part 32 rotates around the rotation center axis. Specifically, when the piston 31*a* moves forward, the first guide frame 33 rotates clockwise in FIG. 8, and when the piston 31*a* moves backward, the first guide frame 33 rotates counterclockwise.

The second support part 22 is rotatably fixed to the second support frame 72 at an end portion near the first support part 11. And it is supported by the support frame 14 via the second drive unit 40 (see FIG. 1). As shown in FIG. 6, the second drive unit 40 includes a second actuator 41, a pair of second guide parts 42, 42, guide frame fixing parts 44, and rollers 45. The configurations of the second actuator 41, second guide part 42, guide frame fixing part 44, and roller 45 are almost the same as those of the first actuator 31, first guide part 32, guide frame fixing part 34, and roller 35, respectively. Therefore, the explanation will be omitted.

Figure 9:
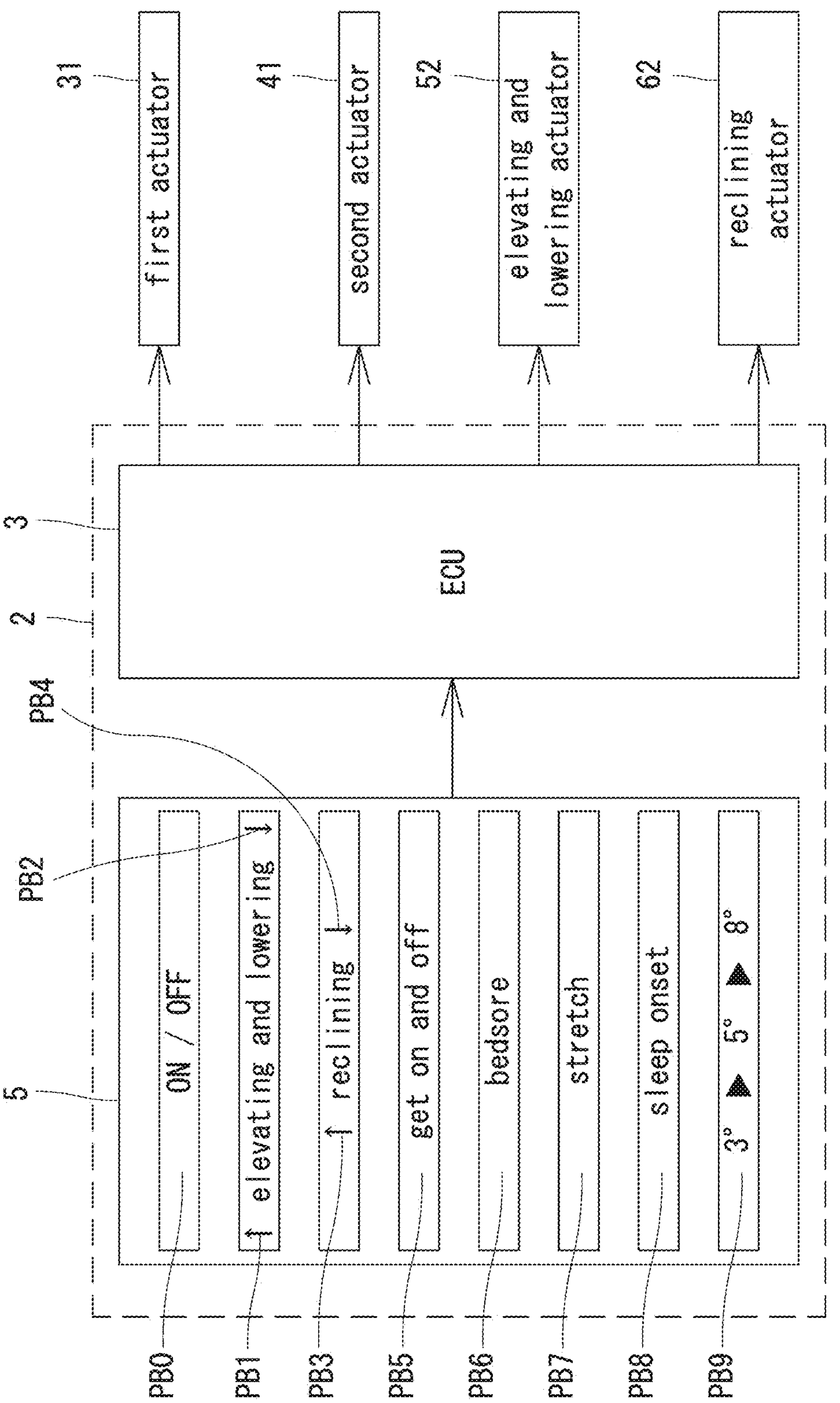
FIG. 9 is a diagram showing a configuration of a control unit.
Figure 10A:
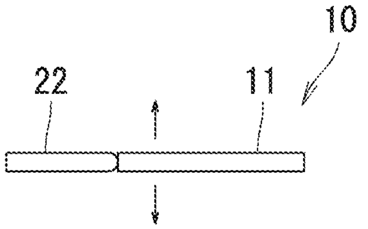
FIGS. 10A to 10G are diagrams showing movement and displacement modes of the first support part and the second support part.
Figure 10B:
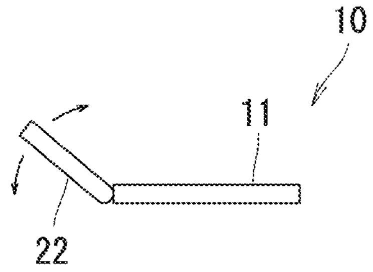
Figure 10C:
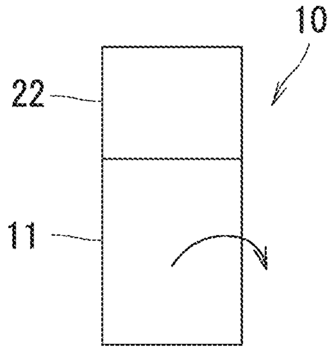
Figure 10D:
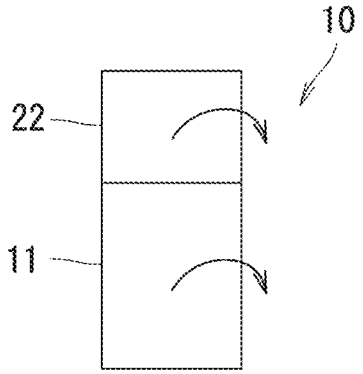
Figure 10E:
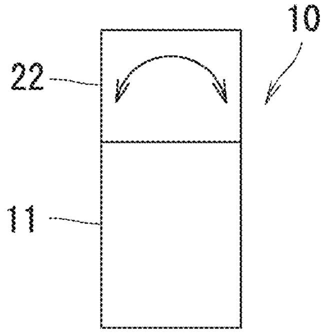
Figure 10F:
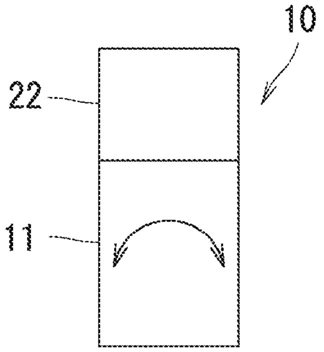
Figure 10G:
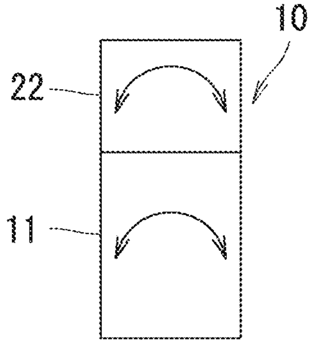

FIG. 9 shows a configuration of the control unit 2. An electronic control unit (hereinafter referred to as ECU 3) is composed of a microcomputer including a CPU, RAM, ROM, I/O interface (all not shown), and the like. An operation panel 5 is connected to the ECU 3, and signals emitted from the operation panel 5 are sequentially input to the ECU 3. The first actuator 31, the second actuator 41, the elevating and lowering actuator 52, and the reclining actuator 62 are connected to the output side of the ECU 3.

Movements of the first support part 11 and the second support part 22 from an initial state when the operation panel 5 is operated will be described with reference to FIGS. 9 and 10. Here, the initial state is a state in which the care bed 1 is placed on a horizontal installation surface, the first support part 11 and the second support part 22 are horizontal to the installation surface, and the distance from the installation surface to the first support part 11 and the second support part 22 is the minimum.

By pressing a push button PB0, the operation panel 5 is energized and becomes in a state where it can send a signal to the ECU 3.

When a push button PB1 is pressed, the elevating and lowering actuator 52 operate, and the piston 52*a* move forward in proportion to the time the push button PB1 is pressed. As a result, the first support part 11 and the second support part 22 are simultaneously elevated by a same distance (see FIG. 10A). The height that can be elevated is determined by the distance that the piston 52*a* can move forward.

When a push button PB2 is pressed, the elevating and lowering actuator 52 operate in accordance with the pressing time, and the piston 52*a* in the forward state moves backward in proportion to the pressing time of the push button PB2. As a result, the first support part 11 and the second support part 22, which are in the elevated state, are simultaneously lowered by a same distance (see FIG. 10A). The lowered distance is determined by the distance the piston can move backward.

When a push button PB3 is pressed, the reclining actuator 62 operates in accordance with the pressing time, and the piston 62*a* moves forward. Thereby, the second support part 22 rotates toward the first support part 11 (see FIG. 10B). The angle at which the second support part 22 can rotate is determined by the distance that the piston 62*a* can move forward.

When a push button PB4 is pressed, the reclining actuator 62 operates in accordance with the pressing time, and the piston 62*a* in a forward state moves backward. Thereby, the second support part 22 in a rotating state rotates in the direction away from the first support part 11 (see FIG. 10B). The rotation stops in a state where it is located on the same plane as the first support part 11. It is preferable that the distance is such that the piston 62*a* cannot move backward any further at this time.

When a push button PB5 is pressed, the first actuator 31 operates and the piston 31*a* moves forward. As a result, the first support part 11 rotates within a range of 3 to 5 degrees around the rotation axis RS from the horizontal state (see FIG. 10C). A more preferable rotation angle is 3 to 4 degrees. After the rotation of the first support part 11 is completed, the first actuator 31 and the second actuator 41 operate simultaneously, and the pistons 31*a* and 41*a* move forward. As a result, the first support part 11 further rotates by 3 to 5 degrees, and the second support part 22 rotates by 3 to 5 degrees (see FIG. 10D). A more preferable rotation angle is 3 to 4 degrees. These series of rotational operations are continuously executed by pressing the push button PB5. As a result, the first support part 11 is rotated by 6 to 10 degrees, and the second support part 22 is rotated by 3 to 5 degrees in the same direction. Since the rotation angle of the first support part 11 that supports the lower body is larger than the rotation angle of the second support part 22 that supports the upper body, the care recipient lying on the care bed 1 can easily get up from the care bed 1 and go down to the floor. By pressing the push button PB5 again, the first actuator 31 and the second actuator 41 operate, and the first support part 11 and the second support part 22 return to their positions before rotation.

When a push button PB6 is pressed, the second actuator 41 operates, and the piston 41*a* repeats forward and backward movement. As a result, the second support part 22 repeatedly rotates by +3° from the horizontal state around the rotation axis RS at a period of about 5 seconds (see FIG. 10E). By pressing the push button PB6 again, the rotation is stopped and the second support part 22 returns to its initial horizontal state. Note that the rotation angle can be changed by pressing a push button PB9 while the second support part 22 is rotating. If the button is pressed once, the rotation angle will be ±5 degrees, if the button is pressed twice, the rotation angle will be ±8 degrees, and if the button is pressed three times, it will return to the initial rotation angle of ±3 degrees.

When a push button PB7 is pressed, the first actuator 31 operates, and the piston 31*a* repeats forward and backward movement. As a result, the first support part 11 repeatedly rotates by ±3° from the horizontal state around the rotation axis RS at a period of about 5 seconds (see FIG. 10F). By pressing the push button PB7 again, the rotation is stopped and the first support part 11 returns to its initial horizontal state. Note that the rotation angle can be changed by pressing the push button PB9 while the first support part 11 is rotating. If the button is pressed once, the rotation angle will be ±5 degrees, if the button is pressed twice, the rotation angle will be ±8 degrees, and if the button is pressed three times, it will return to the initial rotation angle of ±3 degrees.

When a push button PB8 is pressed, both the first actuator 31 and the second actuator 41 operate, and the pistons 31*a* and 41*a* repeatedly move forward and backward. As a result, the first support part 11 and the second support part 22 synchronously and repeatedly rotate by ±3° from the horizontal state around the rotation axis RS at a cycle of about 5 seconds (see FIG. 10G). By pressing the push button PB8 again, the rotation is stopped and the first support part 11 and the second support part 22 return to their initial horizontal state. Note that the rotation angle can be changed by pressing the push button PB9 while the first support part 11 and the second support part 22 are rotating. If the button is pressed once, the rotation angle will be ±5 degrees, if the button is pressed twice, the rotation angle will be ±8 degrees, and if the button is pressed three times, it will return to the initial rotation angle of ±3 degrees. By rotating the first support part 11 and the second support part 22 synchronously and periodically, a sound sleep effect can be obtained.

Note that, from the viewpoint of ensuring the safety of the care recipient, some restrictions are placed on the movement and displacement of the first support part 11 and the second support part 22.

<Restriction 1>

Even if any of the push button PB6, 7, or 8 is pressed while the push button PB3 is pressed and the second support part 22 is rotated, none of the first support part 11 and the second support part 22 rotates around the rotation axis RS.

<Restriction 2>

If one of the push button PB5, 6, 7, or 8 is pressed and any another push button PB5, 6, 7, or 8 is pressed additionally, the signal emitted when the other push button is pressed is not sent to the ECU 3. That is, the operation of the first actuator 31 and the like does not occur when the other push button is pressed.

<Restriction 3>

Even if any of the push button PB5, 6, 7, or 8 is pressed in a state where the first support part 11 and the second support part 22 are tilted, the signal emitted when the push button is pressed is not sent to the ECU 3. That is, in this state, even if any of the push button PB5, 6, 7, or 8 is pressed, the first support part 11 and the second support part 22 do not rotate around the rotation axis RS.

<Modified Example>

Figure 11:
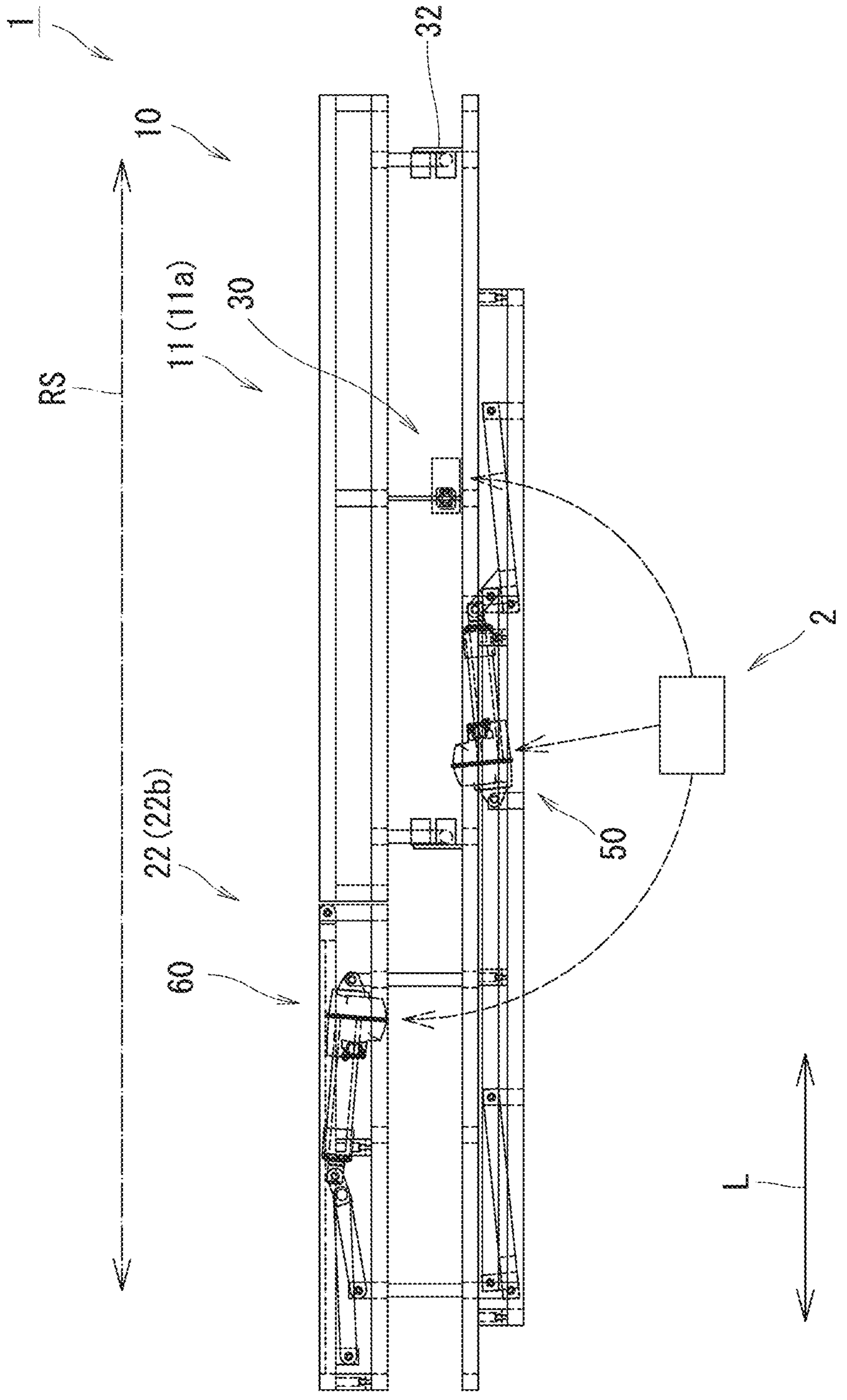
FIG. 11 is a front view of a care bed in which a second support part is fixed, which is a modified example of the present embodiment.
Figure 12A:
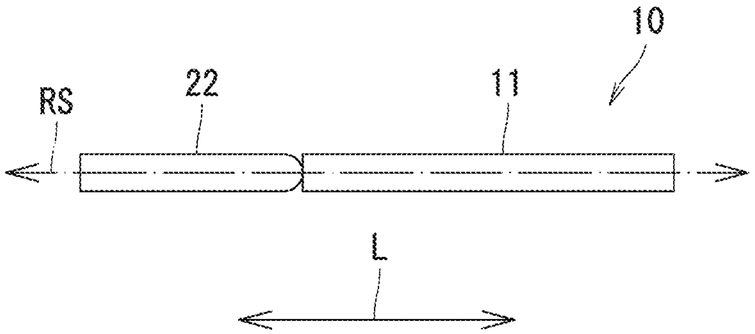
FIG. 12A is a front view of a conceptual diagram of a care bed that is a modified example of the present embodiment and has a rotation axis passing through a first support part and a second support part.
Figure 12B:
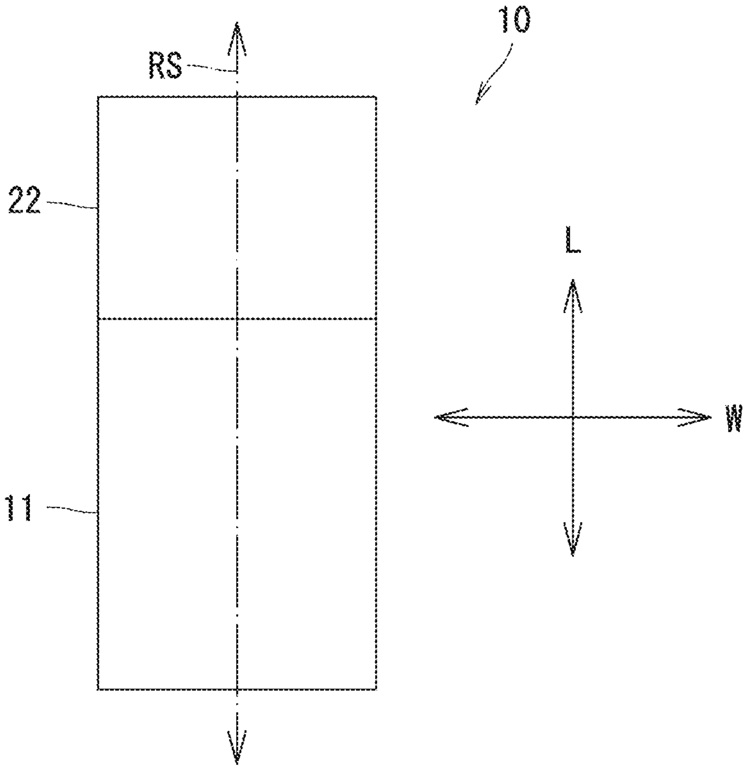
FIG. 12B is a plan view of a conceptual diagram of a care bed that is a modified example of the present embodiment and has a rotation axis passing through a first support part and a second support part.

In the present embodiment, each of the first support part 11 and the second support part 22 rotates independently, but the invention is not limited to this. As shown in FIG. 11, the second support part 22 may be a fixed body 22*b* which is fixed. In this case, the second drive unit 40 becomes unnecessary, and the number of parts required for the care bed 1 can be reduced. Furthermore, as shown in FIGS. 12A and 12B, the position of the rotation axis RS is not limited to be above the first support part 11 and the second support part 22. It may be a position passing through the first support part 11 and the second support part 22.

The present embodiment is an example, and it goes without saying that modifications can be made without departing from the technical idea of the present invention.

INDUSTRIAL APPLICABILITY

The care bed according to the present invention can be expected to have a good sleep effect and a relaxing effect, and can be used not only by care recipients but also by healthy people, so it has great potential for industrial use.

REFERENCE SIGNS LIST

1 . . . care bed
2 . . . control unit
10 . . . bed body
11 . . . first support part
11*a* . . . movable body
22 . . . second support part
22*a* . . . movable body
22*b* . . . fixed body
30 . . . first drive unit
40 . . . second drive unit
L . . . longitudinal direction
RS . . . rotation axis
W . . . width direction

What is claimed is:

1. A care bed comprising a bed body, the bed body comprising:

a first support part for supporting a lower body;
a second support part for supporting an upper body;
a first support frame for fixing the first support part;
a second support frame for fixing the second support part;
a first guide part spanning both side ends of the first support frame; and
a second guide part spanning both side ends of the second support frame,
wherein the bed body is divided into at least the first support part and the second support part in a width direction of the bed body,
wherein the first guide part comprises a first guide frame having an arc shape and a plurality of first rollers holding the first guide frame,
wherein the second guide part comprises a second guide frame having an arc shape and a plurality of second rollers holding the second guide frame,
wherein the first support part is a movable body configured to rotate around a rotation axis extending along a longitudinal direction of the bed body by the first guide frame moving while being guided by the plurality of first rollers,
wherein the second support part is a movable body configured to rotate around the rotation axis by the second guide frame moving while being guided by the plurality of second rollers,
wherein the first support part and the second support part are configured to rotate independently of each other around the rotation axis, and
wherein the rotation axis is located above the first support part and the second support part.

2. The care bed according to claim 1, further comprising:

a first drive unit that rotates the first support part around the rotation axis; and
a second drive unit that rotates the second support part around the rotation axis.

3. The care bed according to claim 2, further comprising a control unit that generates a control signal to instruct operation of the first drive unit and the second drive unit, and outputs the control signal to the first drive unit and the second drive unit.

4. The care bed according to claim 3, wherein the control unit outputs a first signal to instruct rotation of the first support part to the first drive unit, and after the instruction is finished, the control unit outputs a second signal to the first drive unit and the second drive unit to instruct rotation of the first support part and the second support part to further increase a tilting angle of the first support part.

5. The care bed according to claim 4, wherein rotation angles of the first support part and the second support part that respond to the second signal are the same.

6. The care bed according to claim 4, wherein a rotation angle at which the first support part rotates in response to the first signal is 2 to 5 degrees.

7. The care bed according to claim 6, wherein rotation angles at which the first support part and the second support part rotate in response to the second signal is 2 to 5 degrees.

8. A care bed comprising a bed body, the bed body comprising:

a first support part for supporting a lower body;

a second support part for supporting an upper body;

a first support frame for fixing the first support part; and a first guide part spanning both side ends of the first support frame, wherein the bed body is divided into at least the first support part and the second support part in a width direction of the bed body, wherein the first guide part comprises a first guide frame having an arc shape and a plurality of first rollers holding the first guide frame, wherein the first support part is a movable body configured to rotate around a rotation axis extending along a longitudinal direction of the bed body by the first guide frame moving while being guided by the plurality of first rollers, and wherein the rotation axis is located above the first support part.

9. The care bed according to claim 8, further comprising a drive unit that rotates the first support part around the rotation axis.

10. The care bed according to claim 9, further comprising a control unit that generates a control signal to instruct operation of the drive unit and outputs the control signal to the drive unit.

11. The care bed according to claim 10, wherein a rotation angle of the first support part at which the first support part rotates in response to the control signal is 2 to 5 degrees.

* * * * *